United States Patent [19]
Knavish

[11] 3,928,014
[45] Dec. 23, 1975

[54] METHOD FOR PRODUCING FLAT GLASS

[75] Inventor: Leonard A. Knavish, Pittsburgh, Pa.

[73] Assignee: PPG Industries, Inc., Pittsburgh, Pa.

[22] Filed: Apr. 29, 1974

[21] Appl. No.: 465,053

[52] U.S. Cl.................................. 65/136; 65/162
[51] Int. Cl.² ............................................. C03B 5/04
[58] Field of Search .............. 65/134, 135, 136, 162

[56] References Cited
UNITED STATES PATENTS

| | | | |
|---|---|---|---|
| 1,941,778 | 1/1934 | Amsler | 65/135 |
| 2,616,221 | 11/1952 | Hanson | 65/178 |
| 2,890,547 | 6/1959 | Lyle | 65/134 |
| 3,625,718 | 12/1971 | Petticrew | 65/33 X |

*Primary Examiner*—Arthur D. Kellogg
*Attorney, Agent, or Firm*—Dennis G. Millman; William J. Uhl

[57] ABSTRACT

A method for improving the quality of flat glass derived from a high temperature melting glass composition, such as a crystallizable glass composition, is disclosed. The glass is produced in a furnace which is relatively short by flat glass standards. The furnace comprises an elongated melting chamber having bottom and top walls and two generally parallel side walls defining a channel through which molten glass flows from a batch feeding end to a glass forming means located at the opposite end of the melting chamber. The method of the invention involves locating the "spring zone" of the glass melt more towards the forming means of the furnace than is normally associated with continuous tank-type flat glass furnaces.

11 Claims, 3 Drawing Figures

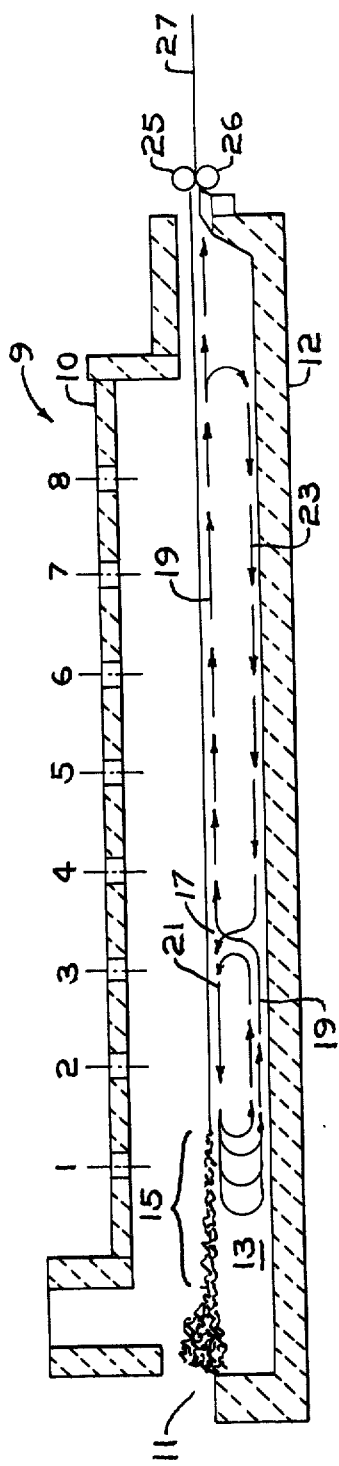
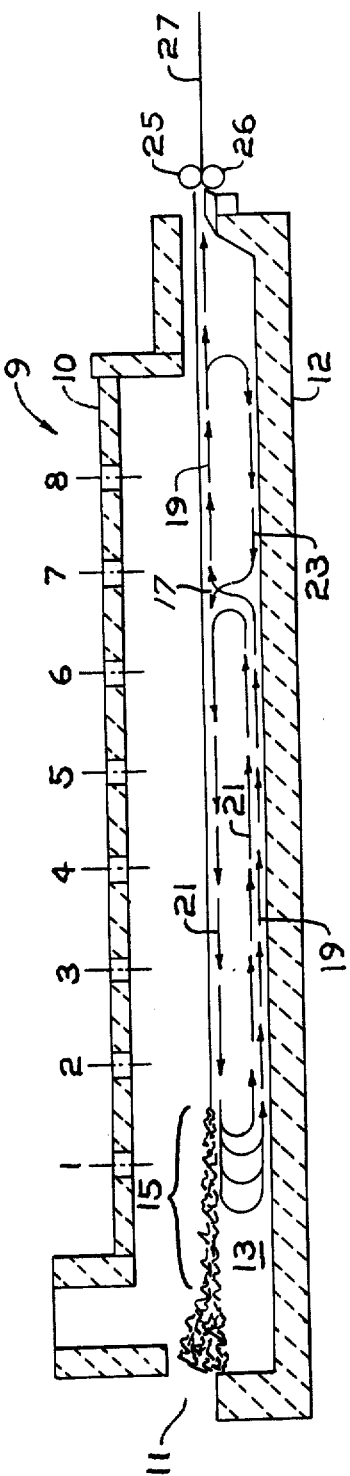

METHOD FOR PRODUCING FLAT GLASS

BACKGROUND OF THE INVENTION

1. Field of the Invention

The present invention relates broadly to the art of glass melting. More particularly, the present invention relates to melting a high temperature melting, highly volatile glass such as crystallizable glass in a relatively short continuous tank-type flat glass furnace so as to produce flat glass of excellent quality.

2. Brief Description of the Prior Art

Crystallizable glasses are special classes of glass which can be heat treated to form the glass into a semi-crystalline ceramic, i.e., 90 percent or greater crystalline phase. The ceramic differs considerably from the original glass in physical, chemical, mechanical and electrical properties. Such ceramics are opaque and generally have a much lower thermal expansion coefficient than the original uncrystallized glass. These properties make the semi-crystalline product particularly attractive for stove top applications. U.S. Pat. Nos. 2,920,971 to Stookey and 3,625,718 to Petticrew describe typical crystallizable glass compositions.

Crystallizable glasses which are of particular importance are those which can be transformed into the crystalline phase, beta-spodumene solid solution. Such glasses are made with the alkali metal oxide $Li_2O$ and contain very little of the good fluxing agents $Na_2O$ and $K_2O$ normally associated with flat glass manufacture, since these latter ingredients adversely affect the expansion coefficient of the resultant crystallized flat glass product. As a result, the crystallizable glasses have very high melting temperatures, that is, from 200° to 400°F. above that required for melting soda-lime-silica glasses.

To provide some fluxing activity, certain preferred crystallizable glass compositions use heavy metal oxide such as ZnO. ZnO is a particularly attractive ingredient because it not only acts as a fluxing agent, but also acts as a promoter for crystallization acting to increase the rate of crystallization. Also, the ZnO does not adversely affect the expansion coefficient.

Unfortunately, heavy metal oxides such as ZnO are quite volatile at the melting temperatures employed in melting crystallizable glass. The high melting and forming temperatures in conjunction with high volatility negates the use of conventional flat glass furnaces which are generally about 150 to 200 feet in overall length. The amount of energy required to keep the glass in the melt form for this long a period of travel through the furnace would be prohibitive. Also, the loss of volatile constituents over this length of travel would be excessive resulting in a glass deficient in volatile constituents and of poor quality. Thus, shorter furnaces about 50 feet in overall length with heat applied across the entire length of the furnace are considered necessary.

With such shorter furnaces, quality control of the glass is a particular concern and conventional flat glass practices with regards to furnace design and melting and forming are not suitable.

Conventional melting practice with soda-lime-silica flat glass has been to heat the glass-making ingredients very vigorously in the back or batch feeding end, followed by a gradual tapering off of temperature in the direction of the thermal conditioning or refining end of the tank. Using such a heating schedule, it is possible to melt the batch quickly and to provide for a relatively long path of furnace travel for thermal conditioning or refining of the glass. In the thermal conditioning area, the glass is quiescent and any bubbles of gas within the glass are thought to rise to the surface and burst. Entrapment of the bubbles in the glass surface leads to what is known in the art as "seedy" glass, and thus, a relatively long period of thermal conditioning was considered necessary to insure that all the bubbles either escaped or dissolved in the glass and did not become entrapped in the glass surface.

However, it has been found that conventional flat glass melting practices of high initial heating followed by a tapering off of the heating schedule are not compatible with shortened furnaces used to melt high temperature melting glasses, in particular glasses containing highly volatile glass-making ingredients. A seedy, striated glass being surface rich in silica and deficient in volatile ingredients results.

The above quality control problems are believed to be due to location of the convection currents which are set up in the glass melt. Such convection currents are shown by the arrows in FIG. 1 which is a cross-sectional elevational view of a continuous tank-type furnace 9 for producing flat glass. The furnace depicted by FIG. 1 is relatively short by flat glass standards, being about 50 feet in overall length and about 9 feet in width. The furnace is heated by eight rows of overhead burners which are extended throughout the length of the furnace. The convection currents within the glass melt are caused by the heating schedule which is depicted as curve A in FIG. 3, which is typical of what flat glass manufacturers believed was necessary to produce quality flat glass. The heating schedule depicted by curve A in FIG. 3 shows a vigorous initial firing or heating of the glass in the first two rows of burners followed by a gradual tapering off of the heating over the remaining rows of burners. With such a firing schedule, the batch melts out early and a relatively long period of furnace travel is set up for the glass to be refined. Unfortunately, however, the glass produced with such a heating schedule is of poor quality, being seedy, striated and being deficient in volatiles and high in silica. Such poor quality is believed to be caused by the convection currents in the glass melt.

Convection currents are due to density difference in the glass caused by temperature gradients in the melt. When the glass batch material is introduced into the charging end 11 of the furnace 9, the molten glass 13 already in the melting chamber is cooled by the relatively cold batch 15, thereby establishing a temperature gradient which runs longitudinally of the furnace with the region of maximum temperature 17 being found to exist at approximately the location of the third port on a furnace such as depicted in FIG. 1. The location of maximum temperature is due principally to the firing schedule such as shown by curve A in FIG. 3. Since the glass is at its highest temperature in this area, it is relatively less dense than the glass in areas on either side. This creates convection currents as shown in FIG. 1. The relatively hot region 17 is referred to as the hot spot or spring zone, being analogous to a spring due to the welling up of the molten glass.

The currents of the glass 19 and 21 which flow along the bottom of the furnace for a short period of travel will well up through the spring zone 17 to the top surface of the glass. Here, the streams will be separated into two sections. One fraction of the stream 21 will return to the colder regions of the furnace. However, since glass is constantly being discharged through the front end of the tank, a portion of the flow of glass coming up through the spring zone will go forward as the product or throughput stream. Not all of the forward stream 19 is drawn off as product glass; there is a return flow (stream 23) along the bottom of the furnace from the front end of the tank to the spring zone 17.

With a relatively short furnace and with convection currents such as depicted in FIG. 1, it was found that the resultant glass product made from high temperature melting, high volatile containing glassmaking ingredients was not commercially acceptable. The glass was very seedy, somewhat reamy due to poor attenuation and homogenization and also the upper surface of the resultant glass product was silica-rich and deficient in the more volatile components of the glass batch. The reasons for these problems were believed to be as follows.

First of all, with regards to the seeds, it was believed that due to the shortened length of the furnace, there was not adequate time for refining of the glass. As can be seen in FIG. 1, the throughput stream 19 flows on the bottom of the furnace for a relatively short period of travel. During this short period of travel, bubbles of gas do not have enough time to escape to the return stream 21 and thus many bubbles are trapped in the throughput stream and show up in the product glass.

The silica-rich and volatile-deficient surface of the glass is also caused by the period of travel that the throughput stream 19 flows along the top surface of the glass. During this period of travel along the top of the glass, the glass is at a relatively high temperature due to the front end firing. Although this front end firing is not as vigorous as the firing in the back end of the furnace, still it is considerable in order to keep the high temperature melting glass sufficiently high in temperature for forming. As a result, the volatile components of the glass are being constantly released to the atmosphere over the relatively long period of travel of the glass from the top of the melt. This results in the formation of a silica-rich and volatile-deficient surface of the glass.

With regards to the reaminess of the glass, this was believed to be due to the relatively short period of travel the throughput stream of glass 19 flows along the bottom of the furnace. When the throughput stream moves along the bottom of the furnace, it is moving next to a fixed boundary and undergoes relatively high total shear. This shear attenuates striae in the glass resulting in better ream quality. As can be seen in FIG. 1, the throughput stream 19 flows along the bottom of the furnace for a relatively short length of travel, approximately only about one-third the length of the furnace. In this situation, this is insufficient time for the striae to be attenuated and diffused adequately for an acceptable product.

From the above, it is apparent that the convection flow patterns set up within the high temperature melting, highly volatile glass in a shortened furnace such as depicted in FIG. 1 are not adequate from the standpoint of the production of good quality flat glass.

Therefore, it is an object of the present invention to alter the convection currents of the glass so as to produce a glass with improved quality in respect to ream, seeds and glass surface homogeneity.

It is a further object of the invention to melt high temperature melting glass-making ingredients, particularly high temperature melting, highly volatile glass-making ingredients such as crystallizable glassmaking ingredients, in a continuous tank-type furnace and to locate the spring zone further towards the forming means of the furnace than is normally associated with flat glass furnaces.

SUMMARY OF THE INVENTION

In accordance with this invention, there is provided a method for producing flat glass from a high temperature melting glass composition, i.e., a glass composition which has a melting temperature of at least 3000°F., in a continuous tank-type flat glass-producing furnace. The furnace comprises an elongated melting chamber including a top and bottom wall and two generally parallel side walls defining a channel through which molten glass flows from a batch feeding end to a glass forming means located at the opposite end of the furnace. The method of the invention comprises feeding the glass-making ingredients to the furnace at the batch feeding end to a bath of molten glass already contained in the furnace. The molten glass is flowed through the furnace from the batch feeding end to the glass forming means. While the glass is flowing through the furnace, heat is applied to the molten glass so as to melt the glass-making ingredients and to maintain the glass in the molten condition. The heating creates convection currents within the molten glass flow and a spring zone of upwardly rising thermal current. The spring zone separates the furnace into a melting zone and a thermal conditioning zone. The melting zone extends from the batch feeding end of the furnace to the spring zone and the thermal conditioning zone extends from the spring zone to the glass forming means. The heat is regulated so as to locate the spring zone more towards the forming means of the furnace than is conventionally associated with flat glass melting practices such that the ratio of the melting zone to the thermal conditioning zone is at least 1.25 to 1, preferably 1.25–1.50 to 1. The top surface layer of the molten glass is withdrawn from the furnace through the forming means to form a continuous ribbon of flat glass.

BRIEF DESCRIPTION OF THE DRAWINGS

FIG. 1, referred to above, and FIG. 2 are elevated cross-sectional views of a continuous tank-type furnace for producing flat glass.

DETAILED DESCRIPTION

Figure 3:
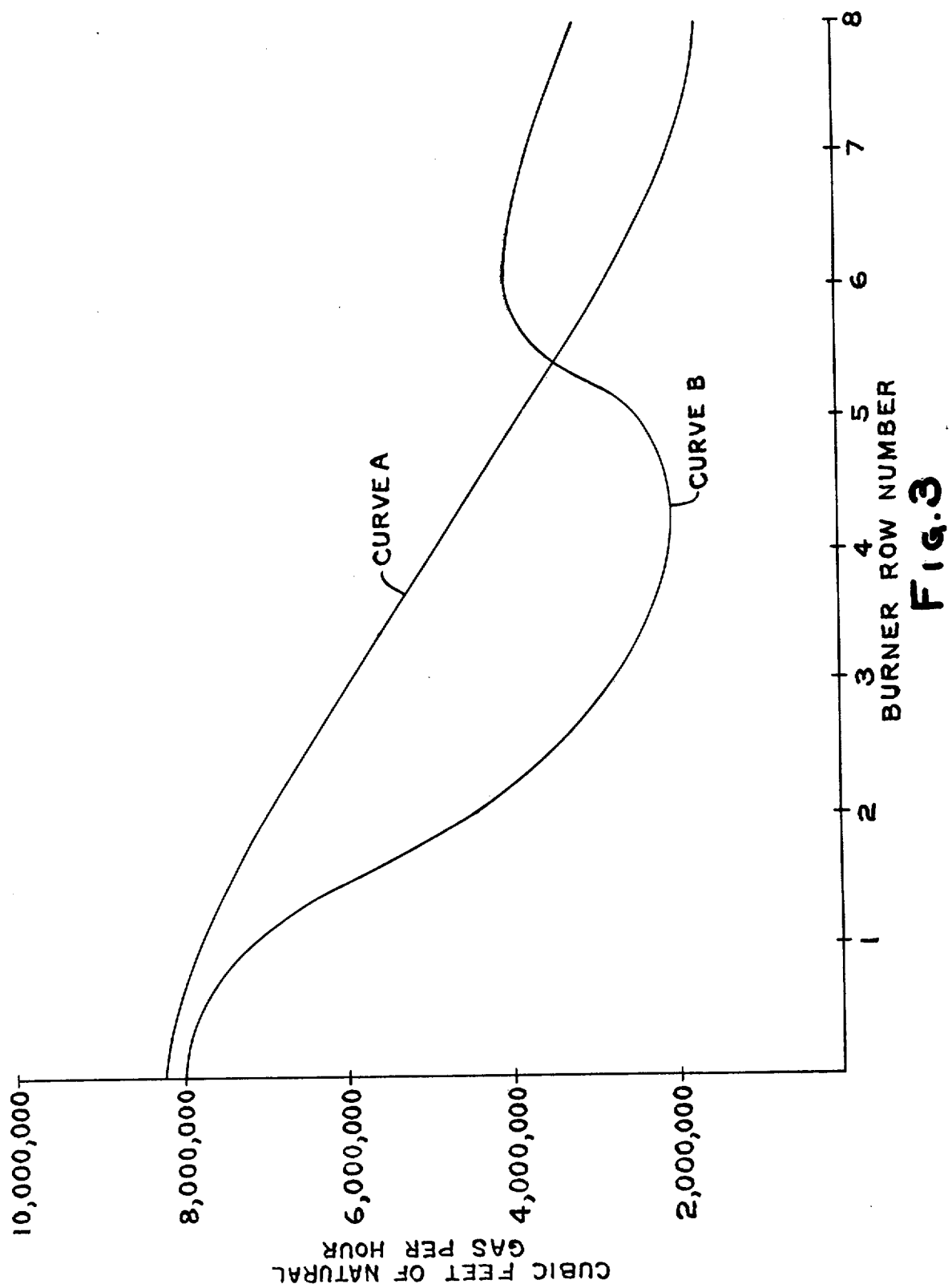
FIG. 3 shows heating schedules for the furnace of FIG. 1 (curve A) and FIG. 2 (curve B).

With reference to FIGS. 1 and 2, there are shown elevated cross-sectional views of a continuous flat glass tank-type furnace 9. The furnace comprises an elongated tank section for containing a bath of molten glass. The tank has a top wall or roof member 10, two side walls and a bottom wall or floor 12, all formed of suitable refractory material. The glass-making material or raw batch 15 is introduced to the charging end 11 of the furnace, commonly called a "doghouse," and is melted and maintained in the molten state by applying heat to the batch and molten glass from rows of overhead burners 1–8 located over substantially the entire length of the furnace. The molten glass is withdrawn from the furnace through forming means 25–26 as a continuously formed glass ribbon 27. It is observed that the temperature is lower at the batch feeding end of the furnace and lower at the front or discharge end of the furnace than it is at a point intermediate these two extremes. These temperature gradients set up convection currents in the molten glass such as is generally depicted in FIGS. 1 and 2 and described above. The hottest portion of the furnace is referred to as the hot spot or spring zone shown as numeral 17 in FIGS. 1 and 2. The molten glass actually flows downhill at the surface, in other words, there is a positive circulation backwards and forwards from the hot spot which can readily be demonstrated by placing pieces of silica brick on the surface of the glass. These pieces will be found to move rearwardly in the furnace if they are back of or upstream of the hot spot and to progress forwardly if they are ahead or downstream of the hot spot. Of course, in addition to this lengthwise movement, it will be found that the silica pieces will also travel outwardly towards the sides of the furnace since the glass at the sides is relatively cooler than it is at substantially the center thereof. Such phenomena clearly indicate that convection currents do exist when the glass in the furnace continuously travels in convection currents such as are generally depicted in FIGS. 1 and 2. Although the tank section is termed a melting chamber, a portion of the tank located to the left of the spring zone 17 extending to the back end wall is referred to as the melting section and the portion of the tank to the right of the spring zone extending to the forming means is referred to as the thermal conditioning section.

Upon its introduction into the tank, the batch material 15 floats on the molten bath of glass. Heat for reducing the batch to molten glass within the melting chamber is provided in part by the first two rows of overhead burners and in part by the rearwardly moving convection stream 21. Conventional flat glass furnace practice would use a heating schedule such as is shown by curve A of FIG. 3 and which would produce convection currents such as depicted by the arrows in FIG. 1 as discussed above. Such a heating schedule and the resulting convection currents produce poor quality flat glass. In the practice of the invention, however, a firing schedule such as is shown in curve B of FIG. 3 is used which would produce convection currents in the molten glass, such as depicted by the arrows in FIG. 2. This moving of the spring zone towards the forming means results in superior quality. The reasons for this superior quality are believed to be as follows.

First of all, the throughput stream 19, flowing along the bottom of the furnace for a relatively long period of travel, results in greater homogenization and attenuation of the striae in the glass, resulting in a glass with substantially less ream. In addition, the throughput stream, by flowing along the bottom of the tank for its major period of travel through the furnace, will present less opportunity for the volatile constituents of the glass-making ingredients to be released from the glass into the atmosphere, in that the distance of travel of the throughput stream of glass 19 to the right of the spring zone 17 will have been shortened.

In addition, by moving the spring zone 17 downstream towards the forming means, there is now adequate time for the seed in the stream 19 to rise into the return stream 21 so that the stream 19 when it emerges as forward moving surface stream at the spring zone 17 will be substantially seed free.

As has been mentioned above, the invention is applicable to the production of high melting temperature glasses, particularly high melting temperature glasses containing volatile components, in relatively short flat glass, continuous, tank-type furnaces. Melting of the glass is the thermal process by which batch charge is completely converted into molten glass free from undissolved batch. The melting temperature of the glass is the range of furnace temperatures within which melting takes place at a commercially desirable rate and at which the resulting glass generally has a viscosity of $10^{1.5}$ to $10^{2.5}$ poises. For the purposes of comparing glasses, it is assumed that the glass at its melting temperature has a viscosity of $10^{2.0}$ poises. Accordingly, as used in the claims, unless otherwise indicated, by the term "high melting temperature" is meant a glass which at a viscosity of $10^{2.0}$ poises has a temperature of at least 3000°F., preferably 3000° to 3300°F.

In order to practice the invention, the high temperature melting glass should have a relatively high forming temperature, and the forming temperature should be close to the melting temperature, i.e., the difference between the melting temperature and forming temperature being about 300°F. or less. The forming temperature of the glass being defined as the temperature at which the glass has a sufficient viscosity so as to be able to be formed by conventional forming means into a shape-retaining object, for example, to be continuously formed into a ribbon. If the forming temperature is too high (and viscosity too low), the glass will wet the rolls and freeze. If the forming temperature is too low and viscosity too high, high stresses will be imposed in the glass resulting in fracturing. Glasses prepared in accordance with the present invention generally have forming viscosities of about $10^{3.25}$ poises or lower, usually in the range of $10^{3.25}$ to $10^{2.8}$ poises, and corresponding forming temperatures of 2700°F. or higher, usually within the range of 2700° to 2950°F.

By the term "highly volatile glass" or a glass containing volatile components, is meant a glass which loses at least 5 percent of a particular component measured on the oxide basis upon melting and forming of the glass. The volatile loss of the component will vary, of course, depending upon the furnace temperature, residence time in the tank, and in what form the components are added, i.e., fluorides are more volatile than oxides. The volatile loss of such a component can be determined by calculating the composition of the glass which should result from the added batch ingredients, assuming no volatile or other loss of ingredients and comparing such calculated composition with the actual composition of the glass after melting and forming. It has been found that components of the glass such as $SiO_2$ and $Al_2O_3$ are relatively non-volatile, there being essentially no loss of these components upon melting and forming. Other components such as $ZnO$, $F^-$, $P_2O_5$ and $B_2O_3$ are very volatile, there being about a 5 to 30 percent loss of these components on an oxide basis when comparing the calculated and actual compositions of the glass. An example of high melting and forming temperature glasses containing highly volatile components are crystallizable glasses. Preferred crystallizable glasses are those containing $ZnO$, a very volatile glass-making ingredient. Typical crystallizable glasses containing $ZnO$ are described in U.S. Pat. No. 3,625,718 to Petticrew. Particularly suitable glasses have the following composition:

| Component | Percent by Weight on the Oxide Basis |
| --- | --- |
| SiO$_2$ | 64 – 74 |
| Al$_2$O$_3$ | 15 – 23 |
| Li$_2$O | 3.3 – 4.8 |
| ZnO | 1 – 3.8 |
| TiO$_2$ | 1.2 – 3.5 |
| ZrO$_2$ | 0 – 2 |
| Sb$_2$O$_3$ | 0 – 0.5 |
| As$_2$O$_3$ | 0 – 0.5 |
| Sb$_2$O$_3$ + As$_2$O$_3$ | 0.2 – 1.0 |

The glass-making ingredients which are melted to form the above-described glass are those which are commonly known in the glass industry and include such materials as glass-making sand, alumina, silicates of zinc and/or zirconium, zirconium oxide, titanium dioxide, lithium carbonate, petalite, cullet, and, to the extent desired or necessary, oxides of arsenic and/or antimony which act as fining agents making glass of the above-described composition.

Melting can be accomplished by radiant surface heating from either side wall ports or from overhead rows of burners which fire down onto the melting compartment above the level of the molten glass. Preferably, as is shown in FIGS. 1 and 2, heat is provided by rows 1 through 8 of overhead burners which extend throughout the length of the furnace. In all, for a furnace with an overall length of some 40–80 feet and having a length-to-width ratio of about 4 to 6:1, which are the relatively short flat glass furnaces contemplated by the present invention, six to 10 rows of burners are needed to melt the glass and keep it in the molten state as it passes from the back to the front end of the furnace. Usually, there are about two to four burners to a row. The batch is usually completely melted by the first two rows of burners, the remaining burners serve to keep the glass molten as it advances through the melting zone. As can be seen in FIGS. 1 and 2, the rows of overhead burners extend over substantially the entire length of the furnace. Instead of overhead burners, heating could be by regenerative firing in which ports opening into the furnace above the level of glass flowing therein are positioned or arranged in intervals on both sides of the furnace. Firing is conducted first on one side of the furnace and then on the other.

After the glass has been suitably melted and thermally conditioned, usually for a period of about 12 to 24 hours on a continuous basis, the top surface of the glass is withdrawn from the furnace such as is shown in FIG. 2 for forming. The glass is formed as a continuous ribbon 27 by forming it between water-cooled rolls 25–26 as it is withdrawn from the furnace. Methods for continuously forming glass by passing it between rolls are well known in the art and a preferred forming embodiment is described in U.S. Pat. Application Ser. No. 222,627, filed Feb. 1, 1972, to Henry M. Demarest, Jr., now U.S. Pat. No. 3,771,984. Alternatively, other means forming the glass, such as float forming, may be used.

After the glass is formed into a continuous ribbon, it usually passes through an annealing lehr to release thermal strains which are introduced into the glass by forming. After annealing, the glass is usually inspected and cut to size.

WORKING EXAMPLE

Description of the Preferred Embodiment

The following well-mixed batch ingredients were charged on a continuous basis to the charging end of a 60-ton capacity flat glass melting furnace such as generally shown in FIG. 2.

| Ingredient | Parts by Weight |
| --- | --- |
| silica | 700 |
| hydrated alumina | 296 |
| lithium carbonate | 83 |
| lithium fluoride | 15.50 |
| titanium dioxide | 6.0 |
| zinc zirconium silicate | 31 |
| zinc oxide | 10.5 |
| antimony trioxide | 4.0 |
| potassium carbonate | 2.5 |
| | 1148.5 |
| Cullet[1] | 1360 |

[1] The glass cullet had the following composition expressed as percent by weight: Na$_2$O, 0.31 percent; Li$_2$O, 3.98 percent; F⁻, 0.27 percent; SiO$_2$, 70.67 percent; Al$_2$O$_3$, 19.39 percent; ZrO$_2$, 1.54 percent; ZnO, 1.53 percent; TiO$_2$, 1.56 percent; K$_2$O, 0.18 percent; As$_2$O$_3$, 0.01 percent; Sb$_2$O$_3$, 0.33 percent.

The glass melting furnace such as shown in FIG. 2 was about 47 feet in overall length and 8-½ feet wide and had a melting area which was capable of holding about 60 tons of glass. The furnace was designed to hold a depth of about 24 inches of molten glass. The furnace contained eight rows of overhead burners, using a natural gas firing and a heating schedule such as is shown by curve B of FIG. 3. The temperature profile in the furnace was somewhat as follows:

At the doghouse, the melt temperature was about 2200°F. At about the third row of overhead burners, a distance of about one-third the overall length of the furnace, measured from the back wall, the melt temperature was about 2700°F. At about the fifth row of burners, the melt temperature was about 3100°F. The spring zone was located at about the seventh row of burners and the temperature of the glass at the spring zone was about 3220°F. As can be seen, the ratio of the melting zone to the thermal conditioning zone was about 1.6 to 1. The molten glass was continuously withdrawn from the furnace and formed between a pair of high temperature-resistant alloyed water-cooled rolls. The forming temperature was about 2950°F. The rolls were set against the delivery lip of the tank so that the glass was forced into the pinch of the rolls and thus squeezed to the desired thickness in the form of a continuously formed ribbon. As the glass passed from the water-cooled forming rolls, the surface was sufficiently chilled to form a more or less self-sustaining sheet or ribbon. Upon inspection, the continuously formed ribbon of glass was of excellent optical flat glass quality. The ribbon as it was formed was seed free. The glass was well attenuated and had little ream. Also, the composition of the glass from surface to surface was relatively uniform indicating that the surface of the glass did not lose volatiles while being melted.

The formed glass was picked up on smaller apron rolls, which were actually a part of an annealing lehr mechanism but were not enclosed as was the rest of the lehr. In this area, the glass lost heat rapidly and the temperature fell to about 2300°F. leaving the rolls to about 1500°F. entering the lehr. In the lehr, the glass was annealed to release thermal strains which were introduced into the glass by forming. After annealing, the glass was inspected and cut to size. The glass at this stage had a nominal thickness of about 0.2 inch and had the following composition:

| Component | Percent by Weight |
|---|---|
| $SiO_2$ | 70.50 |
| $Al_2O_3$ | 19.20 |
| $Li_2O$ | 3.98 |
| $TiO_2$ | 1.60 |
| $ZrO_2$ | 1.50 |
| ZnO | 1.60 |
| $Sb_2O_3$ | 0.35 |
| $As_2O_3$ | 0.01 |
| F | 0.08 |

The glass was of excellent quality, being relatively free of seed and ream. Also, when a cross-section of the glass ribbon was examined under cross polaroids, the composition throughout the thickness of the ribbon was seen to be relatively uniform, that is, the surface composition of the glass was approximately the same as the interior of the glass, indicating relatively little loss of volatile constituents from the glass during its melting in the furnace. This uniformity of composition was substantiated when the glass was transferred to a kiln for a crystallizing heat treatment. The glass was crystallized and became opaque and milky white in appearance and X-ray analysis indicated that the heat treated glass was a glass-ceramic with the principal crystal phase being betaspodumene solid solution and the extent of crystallization being about 98 percent. The glass crystallized uniformly and there was no evidence of cracking or warping.

I claim:

1. A method for producing flat glass, having a high temperature melting glass composition which includes a component which detrimentally volatilizes at the melting temperature, in a continuous tank-type flat glass-producing furnace, said furnace comprising an inlet end wall having a glass batch feeding inlet, a front end wall having an outlet delivering molten glass to a ribbon forming means, and top and botton walls and two generally parallel sidewalls defining a channel through which molten glass flows from the inlet end wall toward the front end wall, said method comprising:
   a. feeding glassmaking ingredients to the furnace through the batch feeding inlet to a bath of molten glass already contained in the furnace,
   b. flowing said molten glass through said furnace from the inlet end wall to the glass ribbon forming means,
   c. applying heat to said molten glass as it is flowing through said furnace, so as to melt the glassmaking ingredients and to maintain said glass in the molten condition; said heating creating convection currents within said molten glass flow and a spring zone of upwardly rising thermal current, said spring zone separating the furnace into a melting zone and a thermal conditioning zone, said melting zone extending from the inlet end wall of the furnace to the spring zone, and the thermal conditioning zone extending from the spring zone to the glass ribbon forming means,
   d. regulating the application of heat so as to locate said spring zone near the outlet end of the furnace such that the ratio of the melting zone length to the thermal conditioning zone length is at least 1.25 to 1,
   e. withdrawing a layer of the molten glass which passes substantially uninterruptedly from the spring zone to said ribbon forming means near the top surface of the molten glass from the furnace, through said outlet, and into said ribbon forming means to form a continuous ribbon of flat glass.

2. The method of claim 1 in which the ratio of the melting zone length to the thermal conditioning zone length is within the range of 1.25 to 1.50:1.

3. The method of claim 1 in which the volatile components are selected from the class consisting of ZnO, $P_2O_5$, $B_2O_3$ and $F^-$.

4. The method of claim 3 in which the glass is a crystallizable glass.

5. The method of claim 3 in which the glass has the following composition:

| Component | Percent by Weight on the Oxide Basis |
|---|---|
| $SiO_2$ | 64 – 74 |
| $Al_2O_3$ | 15 – 23 |
| $Li_2O$ | 3.3 – 4.8 |
| ZnO | 1 – 3.8 |
| $TiO_2$ | 1.2 – 3.5 |
| $ZrO_2$ | 0 – 2. |

6. The method of claim 1 in which the glass has a melting temperature of between 3000° to 3300°F.

7. The method of claim 6 in which the glass has a forming temperature of between about 2700° to 2950°F.

8. The method of claim 7 in which the difference between the melting temperature and the forming temperature of the glass is 300°F. or less.

9. The method of claim 1 in which the furnace has a length-to-width ratio of about 4 to 6:1.

10. The method of claim 1 in which the furnace is heated across substantially its entire length.

11. The method of claim 10 in which the heating is accomplished by radiant surface heating.

* * * * *